May 29, 1945. A. S. RIGGS ET AL 2,376,883
DYNAMIC EARTH INDUCTOR COMPASS
Filed Jan. 30, 1942    2 Sheets-Sheet 1
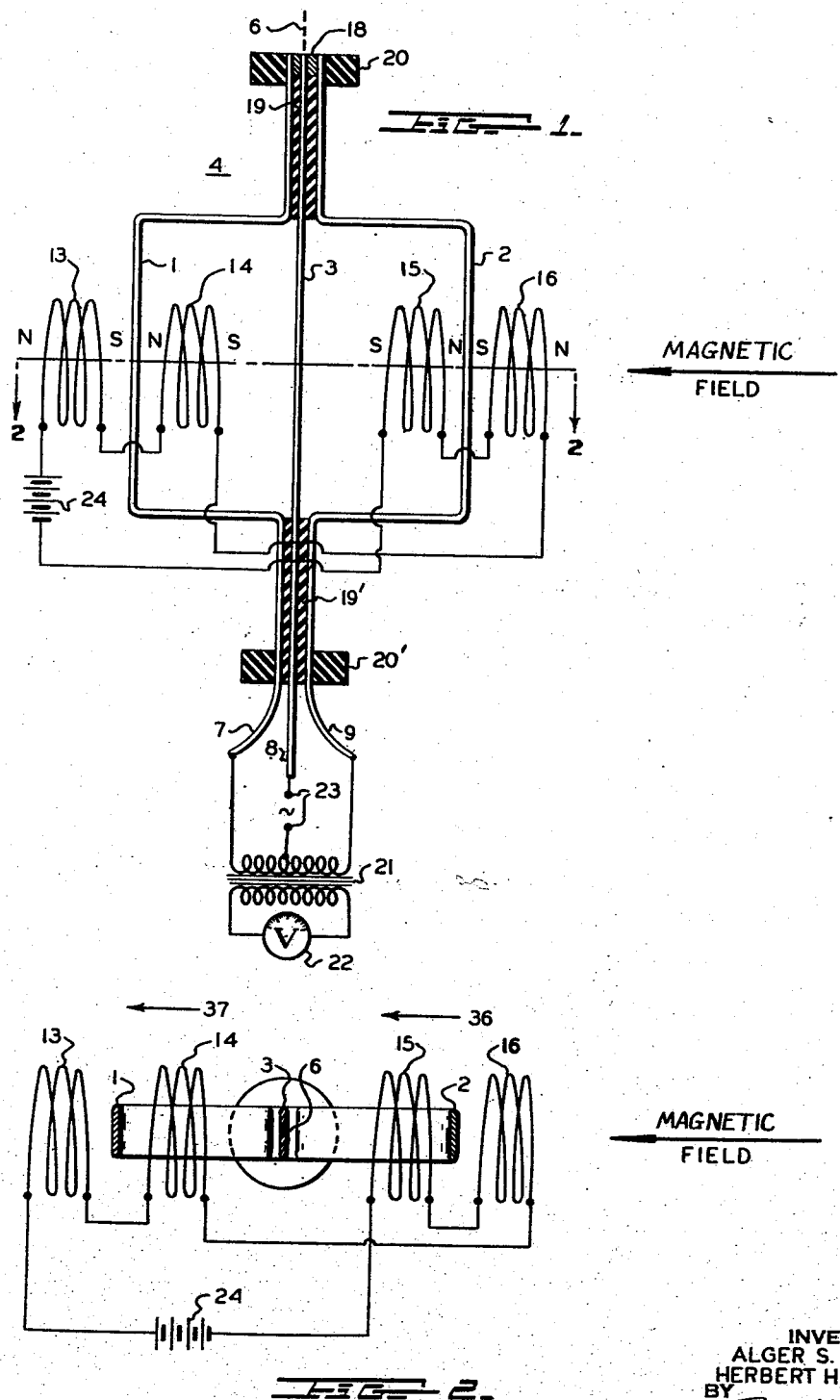
INVENTORS,
ALGER S. RIGGS, &
HERBERT H. THOMPSON,
BY
THEIR AGENT

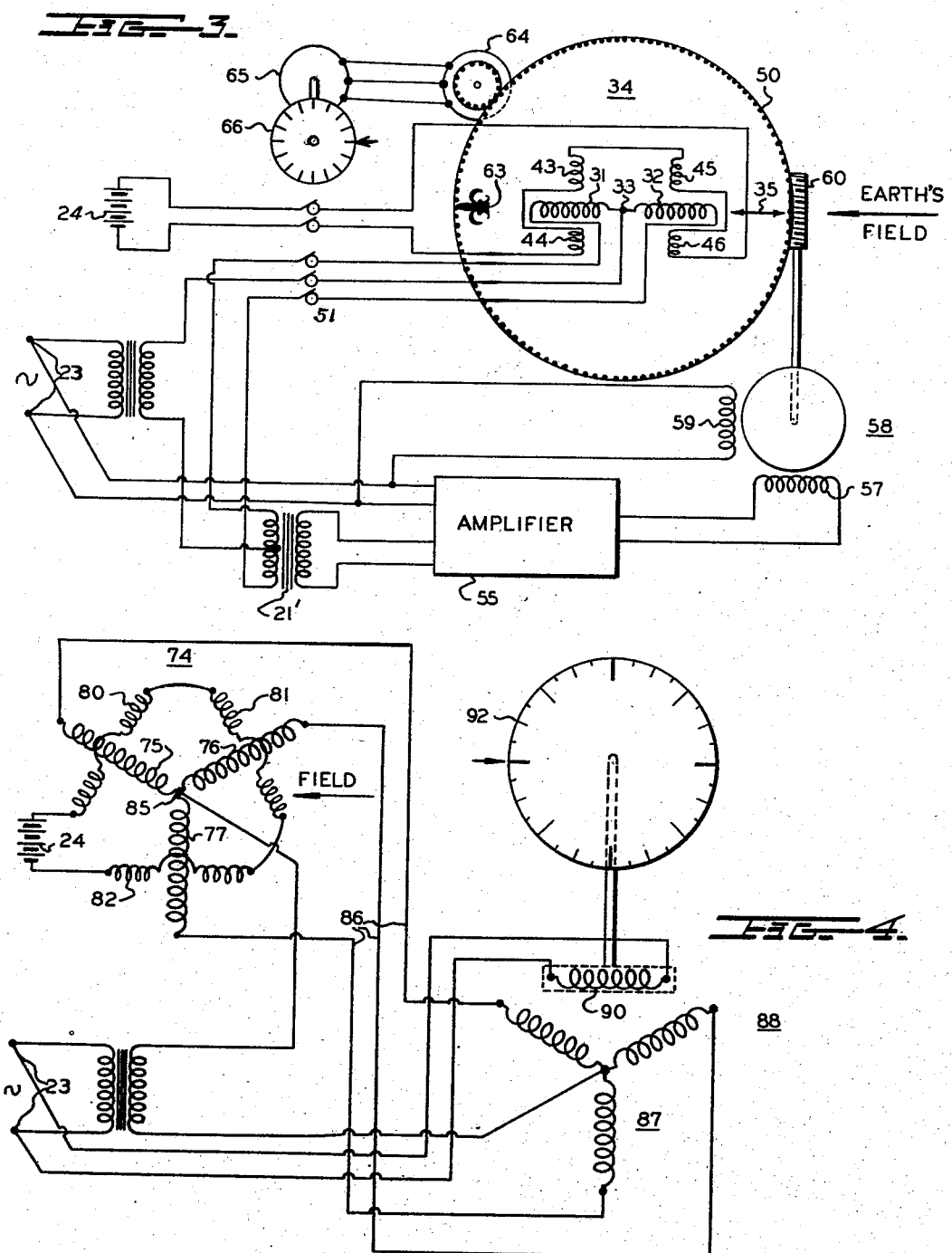

Patented May 29, 1945

2,376,883

UNITED STATES PATENT OFFICE 2,376,883

DYNAMIC EARTH INDUCTOR COMPASS

Alger S. Riggs, Chicago, Ill., and Herbert H. Thompson, Mountain Lakes, N. J., assignors to Sperry Gyroscope Company, Inc., Brooklyn, N. Y., a corporation of New York Application January 30, 1942, Serial No. 428,872

12 Claims. (Cl. 33—204)

The present invention relates to a means for translating the flux of a magnetic field into an electrical quantity and finds application, among other uses, in the construction of magnetic instruments such as earth inductor compasses.

One object of the present invention is the provision of a "flux translator" for generating an E. M. F. of wave form and frequency determined by an exciting voltage and of phase and magnitude determined by a magnetic field to which the instrument is subjected.

Another object of the invention is the provision of a "flux translator" suitable for simultaneously generating a plurality of E. M. F.'s of wave form and frequency determined by an exciting voltage and of relative magnitudes and phases determined by the relationship of a predetermined axis of the generating coils of the "flux translator" to the direction of a unidirectional magnetic field such as the earth's magnetic field.

A further object is the provision of means for indicating, at a point distant from a "flux translator," the direction of a magnetic field such as the earth's field relative to an axis of a mobile craft upon which the "flux translator" is mounted.

A still further object is the provision of an apparatus for obtaining an indication of the direction of a magnetic field which includes the generation of a signal voltage by oscillating a conductor in the field.

Other objects and advantages of the present invention will be apparent as the description proceeds.

Referring to the drawings,

Fig. 1 is a diagrammatic representation of one form of the invention adapted to produce an E. M. F. in accordance with relative displacement of an axis of the instrument and the direction of an external magnetic field, such as the earth's magnetic field.

Fig. 2 is a sectional view in diagrammatic form of the device illustrated in Fig. 1, the section being taken along the line 2—2 of Fig. 1.

Fig. 3 is a diagrammatic representation of a self-orienting earth inductor compass according to the invention, utilizing a "flux translator" such as illustrated in Figs. 1 and 2.

Fig. 4 is a diagram illustrating a further modification of the invention in which a plurality of generating coils is employed for generating E. M. F.'s proportional to a corresponding number of components of a magnetic field, the E. M. F.'s being suitable for actuating a remote "Selsyn" type indicator.

Throughout the drawings, like parts are similarly designated.

Primarily, the present invention comprises a device, sometimes referred to herein as a "flux translator," or simply "translator" for securing an alternating electric signal or signals proportional to the strength and direction of a unidirectional magnetic field.

The translator of the present invention serves the same general purpose as that shown and described in the copending application of one of the present inventors, A. S. Riggs, Ser. No. 428,652, filed January 29, 1942, but depends for its operation upon the generator action of an oscillating coil in a magnetic field, instead of on the torque acting on a suitably excited coil in such a field, as is the case with the device disclosed in the aforesaid application.

According to the present invention a generating coil is caused to oscillate in a magnetic field, such as the earth's field, by the interaction of an auxiliary alternating field due to an exciting current supplied to the coil and local driving or motor fields which are oppositely or astatically arranged with relation to the external magnetic field, that is, which have no net effect in inducing an output voltage in the generating coil. Oscillation of the coil in the earth's or other field by the driving fields generates the desired useful output signal voltage. By utilizing the same coil, or portions of the same coil, to secure both motor and generator action, a reduction in weight of the moving or oscillating member is accomplished and also, what is an important consideration, the motor and generator functions of the device are readily separated. This dual use of the inductors of the coil for both motor and generator action will be understood by reference to the drawings.

Referring first to Fig. 1, which illustrates the general principle of our device for detecting and measuring the strength of a magnetic field, the flux translator comprises divided coil 4 formed by inductor members 1, 2 and 3. Coils 13, 14 and 15, 16, respectively form a pair of motor fields for oscillating coil 4, which are oppositely poled as shown. With suitable adjustment the fluxes of the two motor fields may be made equal and opposite so that there is no overall resultant flux due to their excitation along the common axis of these coils.

Members 1, 2 and 3 are preferably formed from a ribbon of conducting material such as aluminum as is better seen in Fig. 2. The upper and lower portions of inductor 3 are spaced from inductors 1 and 2 by insulating bushings 19, 19', respectively, but the three inductors are in electrical contact at their upper extremities through conducting plug 18. Inductor or coil assembly 4 is mounted between fixed supports 20, 20' which may be of rubber or other resilient material to allow a limited rotation of the coil about the axis of inductor 3. Obviously other resilient restraining means may be employed.

Thus, the coil has two separate sections symmetrically located about its axis of rotation which have identical electrical and mechanical characteristics. The coil is therefore adapted, when suitably driven, to oscillate about this axis with blocks 20, 20' serving as resilient restraining means.

The lower ends of inductors 1 and 2 are connected to the outer terminals of the primary or input winding of transformer 21 which has a secondary or output winding connected to an indicator, shown as voltmeter 22. A source of alternating current 23 is connected between inductor 3 and a mid-tap on the primary of transformer 21. A source of direct current 24 is connected to coils 13, 14, 15 and 16 in a series circuit. Although the operation of the inductor is described with the electrical connections as illustrated, the current sources 23 and 24 may be interchanged, if desired, without in any way affecting the principle of the device.

In operation, direct current from source 24 supplied to coils 13 and 14 sets up a unidirectional field cutting across inductor 1. Also, alternating current supplied from source 23 to the loop formed by inductors 1 and 3 sets up an alternating field at right angles to the first field. Interaction of these two fields results in an alternating torque tending to oscillate inductor 1 about its position of equilibrium at an amplitude determined by the magnitude of the torque and the restraining action of resilient supports 20, 20'. At the same time the unidirectional field set up by current from source 24 in coils 15 and 16 reacting with the alternating field of the loop formed by inductors 2 and 3, which is excited by current from source 23, produces a torque tending to oscillate inductor 2 and by proper connections the two described torques may be made to add and produce a resultant which causes oscillation of coil assembly 4 as a whole about its axis of symmetry 6. If an external magnetic field, such as the earth's field, is present, the oscillation of the loop formed by inductors 1 and 2 in this field will cause the coil to act as a generator and produce an alternating potential across terminals 7 and 9 which will then be applied to indicator 22 by way of transformer 21. At the same time, alternating potentials will be independently generated in the two halves of coil 4 by the oscillation of inductor 1 and 2 respectively in the motor fields but these potentials will be in opposition, as will be apparent from the poling of the fields, and therefore will produce no net voltage across terminals 7 and 9.

When the translator is excited from the two sources so that motor action is present causing, in the described manner, an oscillation of coil 4 and this oscillation is of constant magnitude, the effective value of the voltage across terminals 7 and 9 (generated voltage) depends upon the magnitude of the external field and the relation of the mean position of the plane of coil 4 to the direction of the external field, being a maximum in the relationship shown in Fig. 2, and being zero when the device as a whole is rotated relative to the field 90° in either direction from the illustrated position.

At a constant amplitude of oscillation, therefore, and in a constant external field the indication of indicator 22 will vary with change of direction of the field relative to the translator, this variation being a sinusoidal function with respect to relative angular change of the direction of the field. The phase of the output reverses as the direction of the magnetic field departs from coincidence with the mean position of the magnetic axis of the inductor loop in opposite directions.

If the device is to be used for a compass, the indicating instrument 22 may be graduated in terms of heading. 180° ambiguity in the indication may be avoided by providing a reference phase device driven synchronously with the oscillation of the loop. Phase detection by such means is well known in the art. However, as a detector of a magnetic field, such ambiguity will ordinarily not be troublesome.

Referring now to Fig. 3, a modification of the invention is shown in which a self-orienting device is secured by controlling orienting means from the flux translator. Translator 34, corresponding to device 4 of Figs. 1 and 2 is shown schematically as comprising a multi-turn divided coil 31, 32, center-tapped at 33 and adapted when energized to produce a field in the direction of double-tipped arrow 35. Motor field coils 43, 44 and 45, 46 corresponding to coils 13, 14, 15 and 16 of Figs. 1 and 2 are connected to source 24 as before and produce fields at right angles to 35. The translator is mounted on a horizontal rotatable support 50 and connections to it are made by way of slip rings 51. The net output of coil 31, 32 is connected by way of transformer 21' to amplifier 55, which may be A. C. operated from source 23. The output of amplifier 55 is then supplied to one stator phase 57 of two phase motor 58 whose other stator phase is energized from source 23. Motor 58 is connected to rotate support 50 by way of worm 60 meshing with teeth cut on the periphery of the support. An index 63 on support 50 or on a card driven thereby may indicate the orientation of the support which may also be indicated remotely by means of a self-synchronous transmission system employing "Selsyn" transmitter 64 driven from support 50 and "Selsyn" receiver 65 positioning compass card 66.

The operation of the arrangement of Fig. 3 will be apparent from the described characteristics of the translator of Figs. 1 and 2. Coil 31, 32, when the two halves thereof are excited (instantaneously in opposite directions) with alternating current from source 23, is oscillated in the earth's or other field by reaction with the fields of coils 43, 44, 45 and 46 and generates an alternating voltage which varies with the relative displacement between the direction of the field of coil 31, 32 and that of the earth's field. This voltage which is of reversible phase dependent upon the sense of the displacement is amplified by amplifier 55 and applied to stator winding 57 to cause operation of motor 58 and rotation of support 50 in the direction which reduces the output of coil 31, 32 to zero or to a minimum, this condition occurring with the direction of the coil's field coincides with the direction of the earth's field.

In Fig. 4 is shown a modification of the flux translator having three separate axes of motor and generator action and adapted to translate the earth's field into a corresponding number of component A. C. voltages which may be transmitted to a point remote from the translator to actuate an indicator of the "Selsyn" type.

74 is a flux translator comprising generator coils 75, 76 and 77 arranged when excited to produce three equi-angularly positioned fields. There coils form an assembly which is mounted for oscillation as a whole about its axis of symmetry which in turn is perpendicular to the plane in which the magnetic axes of these three coils lie. Associated with each generator coil is a split motor field coil having a magnetic axis at right angles to that of the generator coil in the plane of the generator coil axes. Thus, motor coil 80 is positioned to react with generator coil 75, motor coil 81 with coil 76 and motor coil 82 with coil 77. The three motor coils are shown as supplied in series with direct current from source 24 although obviously a parallel connection may be employed. Due to the symmetry of their arrangement the resultant of the fields of coils 80, 81 and 82 may be made zero, for example, in the case of similar coils, with equal excitation. The only unidirectional field acting on the device as a whole is then the earth's or other field whose direction is to be indicated.

Coils 75, 76, and 77 are connected in Y with a neutral point at 85. The outer terminals of the coils are connected by three conductor line 86 to the external terminals of the three Y connected windings of a member 87 (here illustrated as the stator) of "Selsyn" receiver 88 which has another member (rotor) 90 excited from source 23. A connection from A. C. source 23 is also made to the neutral points of the two Y connected networks of the translator and the receiver. Again, as in the case of the motor coils, due to the symmetrical arrangement of coils 75, 76 and 77 in the translator, and the similar arrangement of the corresponding coils of stator 87, the resultant fields in each instrument due to excitation from source 23 may be made substantially zero. This may be termed an astatic arrangement since the external effect of the local fields producing motor action is zero and the operation of the device then depends only on the measured or indicated external field.

The reaction of the two sets of fields due to excitation of coils 75, 76 and 77 from source 23 and of coils 80, 81 and 82 from source 24 oscillates the assembly comprising 75, 76 and 77 about its axis of symmetry which is perpendicular to the coil axes. In indicating the direction of an external magnetic field the plane of the generator coil axes is positioned parallel to the direction of the field with the oscillation axis perpendicular to that direction. In the case of the earth's field the oscillation axis will normally be vertical, the device then being sensitive to the horizontal component of the field.

By their oscillation in the field to be indicated, each of the coils 75, 76 and 77 generates a voltage which depends on the relation of the direction of the axis of the coil to the direction of the field, the voltage being proportional to the sine of the angle between these two directions. The three coils therefore resolve the external field vector into three components and furnish an A. C. signal voltage proportional to each component to stator 87 of "Selsyn" receiver 88 which, in a well known manner, when suitably excited at the signal frequency positions rotor 90 in the direction of the resultant of the three component fields produced in stator 87, that is, in the direction of the measured field.

Rotor 90 may be connected to operate indicating means such as compass card 92 which therefore provides a remote indication of the direction of the measured field.

It is to be understood that in each modification of the invention, the relative position of the translator and measured field is susceptible of initial adjustment to a desired position and also that in the case of an arrangement such as tht of Fig. 4, an initial adjustment of the azimuth position of either translator 74 or a member of receiver 88 or both may be made so that the indication may be caused to furnish bearings relative to a desired reference line such as an axis of a mobile craft on which the translator is mounted.

Furthermore, while the illustrations of certain modifications of the flux translator show the inductor member as a single turn coil or loop or as a pair of such loops while in other modifications a multi-turn coil has been illustrated, it will be obvious to those skilled in the art that either type of coil may be used in any of the various applications to which the invention may be put and therefore unless otherwise limited, the terms coil and loop as used in the description and claims are to be understood to apply to a member having either a single turn of conducting material or a plurality of turns as may be desirable.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In apparatus sensitive to a magnetic field, a loop inductor turnable about an axis substantially perpendicular to the magnetic axis of the loop, a source connected to supply alternating current to said inductor, and means for producing a unidirectional driving field reacting with the alternating field of said inductor to cause oscillation of the inductor about said axis, said driving field and inductor being so related that the resultant voltage generated by turning of the inductor in said driving field is zero.

2. In an earth inductor compass, a looped inductor, means for exciting said inductor with alternating current, means supporting said inductor for oscillation about a vertical axis, with the magnetic axis of the loop horizontal, means for supplying unidirectional magnetic flux reacting with the alternating field of said inductor to cause oscillation of the inductor about said vertical axis, said inductor and flux being so related that the resultant of the potentials induced by said oscillation of said inductor in said flux is substantially zero, and means connected to said inductor for indicating the potential induced therein due to said oscillation of the inductor in the earth's magnetic field.

3. In an earth inductor compass, a conducting loop mounted for oscillation about a vertical axis in the plane of the loop, resilient restraining means limiting the amplitude of oscillation, means producing oscillation about said axis including a coil having a substantially horizontal magnetic axis for producing flux interacting with the flux of said loop, a source of alternating current, and a source of direct current, one of said sources being connected to said loop and the other to said coil, and connected means for indicating the potential generated in said loop when oscillating in the earth's magnetic field.

4. In an earth inductor compass, a conducting loop mounted for oscillation about a vertical axis in the plane of the loop, said plane being oriented parallel to the direction of the earth's magnetic field, resilient restraining means limiting the amplitude of oscillation, means producing oscillation about said axis including a coil having a substantially horizontal magnetic axis for producing flux interacting with the flux of said loop, a source of alternating current, and a source of direct current, one of said sources being connected to said loop and the other to said coil, and connected means for indicating the potential generated in said loop when oscillating in the earth's magnetic field.

5. In apparatus for indicating the strength of a magnetic field, a multi-section conducting coil supported for oscillation about an axis perpendicular to the magnetic axis of the coil, means for orienting said magnetic axis relative to the direction of the field, and means creating local driving fields equal in number to said sections and reacting respectively with the fields of said sections to oscillate said coil as a whole about said axis, said sections being so connected that the resultant of the potentials generated in said coil due to oscillation of said sections in said driving fields is zero.

6. In apparatus for measuring the strength of a magnetic field, a bifurcated plane loop inductor oriented to have the magnetic axes of its two sections substantially perpendicular to the direction of the measured magnetic field and supported for oscillation about an axis perpendicular both to the coil axes and to the direction of the field, a pair of motor coils for creating driving fluxes respectively reacting with fluxes due to currents in the two sections of said loop, a source of alternating current, and a source of direct current, one of said sources being connected in parallel to the two sections of said loop and the other source being connected to said motor coils, the relation of said motor coils and inductor being such that the resultant of the voltages generated in said inductor due to movement in the fields of said motor coils is a minimum.

7. In apparatus for detecting the presence of a unidirectional magnetic field, an inductor comprising two coplanar non-coincident loops, connections providing parallel and series connections of said two loops, a source of alternating current connected to excite said two loops in parallel, means creating local driving magnetic fields independently reacting with said two loops to oscillate the inductor as a whole, and means connected for indicating the resultant voltage generated in said two loops in series due to oscillation thereof in an external magnetic field.

8. A self-orienting earth inductor compass comprising a support rotatable about a vertical axis, rotating means therefor, a flux translator mounted on said support including a multi-section inductor mounted for oscillation relative to said support about a vertical axis, means for exciting the several sections of said inductor with alternating current, means on said support creating unidirectional local magnetic fields reacting respectively with the alternating fields of said several sections for oscillating said inductor about said axis, said inductor sections being so interconnected that the resultant of the potentials induced in said inductor due to motion in said fields is a minimum approaching zero, and means for controlling said rotating means in accordance with the potential induced in said inductor by oscillation in the earth's field.

9. An inductor, resilient means supporting said inductor for limited oscillation about an axis thereof, means supplying current to said inductor to produce a motor field, means for producing a local field reacting with said motor field for producing oscillation of said inductor about said axis, and means responsive to potentials induced in said inductor by oscillation thereof in an external magnetic field for maintaining the mean position of said inductor at an angle of minimum coupling with said external field.

10. An earth inductor compass adapted to actuate a remote indicator of the "Selsyn" type comprising a flux translator having three interconnected generator coils, the axes of said coils being spaced at equal angles in a horizontal plane, means for oscillating said inductor about a vertical axis including means for producing a constant magnetic field and a source of alternating current connected to excite said three coils, a Selsyn receiver, said receiver having rotor and stator members, one of said members having a three part winding, the parts of said winding being connected respectively to the three coils of said inductor for receiving voltages generated in said inductor by the oscillation thereof in the earth's field, and indicating means driven from said rotor.

11. A remote indicating earth inductor compass comprising a flux translator having a three coil Y connected inductor, the axes of said coils being equally spaced in a horizontal plane, a Selsyn receiver including stator and rotor members, one of said members mounting a three part Y connected winding, a transmission line connecting corresponding external terminals of said two Y connected networks, a source of alternating current connected between the neutral points of said two networks, said source also exciting the other member of said receiver, and means creating magnetic fields reacting with the alternating fields of said inductor coils for oscillating said inductor coils about a substantially vertical axis to generate voltages proportional to the components of the earth's field respectively perpendicular to said coils for actuating said receiver to indicate the direction of the earth's magnetic field.

12. In a system for remotely indicating the direction of a magnetic field, a flux translator comprising an inductor member mounted for oscillation about an axis and having a plurality of inductor coils positioned to have their respective magnetic axes equi-angularly spaced in a plane substantially perpendicular to said axis of oscillation, motor coils equal in number to said inductor coils and respectively adjacent thereto, said motor coils having magnetic axes respectively positioned at substantial angles to the axes of said inductor coils in the plane thereof, a source of alternating current, a source of direct current, one of said current sources being connected for exciting said inductor coils and the other of said sources being connected for exciting said motor coils for creating reacting magnetic fields which produce an alternating torque oscillating said inductor member about said axis of oscillation whereby upon said flux translator being subjected to an external magnetic field voltages are generated in said inductor coils dependent upon the angles between the direction of said external field and the respective axes of said coils, and indicating means adapted to receive the outputs of said inductor coils and provide an indication in accordance therewith.

ALGER S. RIGGS.
HERBERT H. THOMPSON.